US008234658B2

(12) United States Patent
Hope

(10) Patent No.: US 8,234,658 B2
(45) Date of Patent: Jul. 31, 2012

(54) DEVICE FOR COORDINATING DISPLAYS ON A SECURITY SYSTEM

(75) Inventor: Gordon Hope, Miller Place, NY (US)

(73) Assignee: Honeywell International Inc., Morristown, NJ (US)

( * ) Notice: Subject to any disclaimer, the term of this patent is extended or adjusted under 35 U.S.C. 154(b) by 1008 days.

(21) Appl. No.: 11/967,409

(22) Filed: Dec. 31, 2007

(65) Prior Publication Data

US 2009/0172711 A1 Jul. 2, 2009

(51) Int. Cl.
*G06F 9/44* (2006.01)
*G08B 23/00* (2006.01)
*G05B 9/02* (2006.01)

(52) U.S. Cl. ........... 719/318; 340/500; 700/79; 716/328

(58) Field of Classification Search .................. 340/500; 700/79; 719/318, 328
See application file for complete search history.

(56) References Cited

U.S. PATENT DOCUMENTS

| | | | | |
|---|---|---|---|---|
| 5,987,103 | A * | 11/1999 | Martino | 379/93.17 |
| 7,047,092 | B2 * | 5/2006 | Wimsatt | 700/83 |
| 7,728,712 | B2 * | 6/2010 | Girgis et al. | 340/7.48 |
| 2004/0051739 | A1 * | 3/2004 | Schmickley et al. | 345/772 |
| 2009/0128323 | A1 * | 5/2009 | Milbar | 340/539.1 |

* cited by examiner

*Primary Examiner* — Charles E Anya
(74) *Attorney, Agent, or Firm* — Husch Blackwell

(57) ABSTRACT

The inventive system and method for enabling external applications to display data in the security system has a table with a plurality of rules and an interface for processing the external application data for display, such that when an alert occurs in the security system, one of the rules defines a response to the alert and the device performs the response. This system and method protects the integrity of the security system as well as allows the display of data by external applications on the security system.

12 Claims, 3 Drawing Sheets

DEVICE FOR COORDINATING DISPLAYS ON A SECURITY SYSTEM

FIELD OF THE INVENTION

This invention relates generally to security systems having a global communication system interface. In particular, this invention relates to a security system interface, accessible by developers external to the security system, that coordinates displays from the security system with displays from external systems.

BACKGROUND OF THE INVENTION

As web connectivity, graphical information and security applications converge on the home of the future, challenges exist in providing proper solutions that balance all needs. By way of example, a security system that is internet connected can serve as a household internet appliance. Such a system offers an all-in-one approach to its customers, providing both local security panel control, and broad internet content. Users of this system can obtain not only information about the status of the areas protected by the security system, but also general information from the internet, such as news, weather, sports scores, etc. This functionality is provided by a routine in the security system that gathers all content and renders all of this content to the security system. In this approach, the security system routine maintains control of all aspects of data collection and dissemination, to ensure proper handling of any and all security events.

Some security systems permit interaction with a graphics system. Priority logic is handled by the security system software regarding what is to be displayed and when it will be displayed. This priority logic is typically built into the security system. Moreover, data from external news feeds, for example, can be given to the security system in a closed-loop, controlled environment. In this situation, the security system controls data content as well as when the data can be displayed.

Among the problems of the aforementioned systems is the lack of a device or component, such as a centralized rules manager, to maintain control of all of the information sent to the security system's display. Without such a rules manager, it is quite likely that non-life safety events and activities could override those more critical events that a person may need to see and react to immediately. Therefore, there is a need for a rules manager functioning to police events and maintain high priority for life safety functions when needed while allowing other applications, distinct from the security system, to coexist peacefully with the security system.

SUMMARY OF THE INVENTION

The present invention advantageously provides a device, such as a software based priority and/or rules manager, for a security system that facilitates total freedom of development for application developers of internet sessions, enabling development and deployment of applications displaying information unrelated to the security system data on a security system graphical display. At the same time, the inventive manager allows the security system security panel to have priority to properly and effectively take control of its graphical displays for purposes of handling life/safety on premise situations either requiring notification on the display, or accepting input by a user through a touch screen portion of the display. The solution includes at least two key elements, an application program interface and a set of table parameters or rules.

The inventive system and method for enabling external applications to display data in the security system has a table with a plurality of rules and an interface for processing the external application data for display, such that when an alert occurs in the security system, one of the rules defines a response to the alert and the device performs the response. This system and method protects the integrity of the security system in addition to allowing the display of data by external applications.

The foregoing and other objects, aspects, features, advantages of the invention will become more apparent from the following description and from the claims.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

An inventive solution is presented to the need for a device or component in a security system that enables applications distinct from the security system to access the security system display devices, yet the component still maintains all the other features and benefits attributed to highly protected, impregnable security systems. The component can be either hardware or software or a combination of both.

Figure 1:
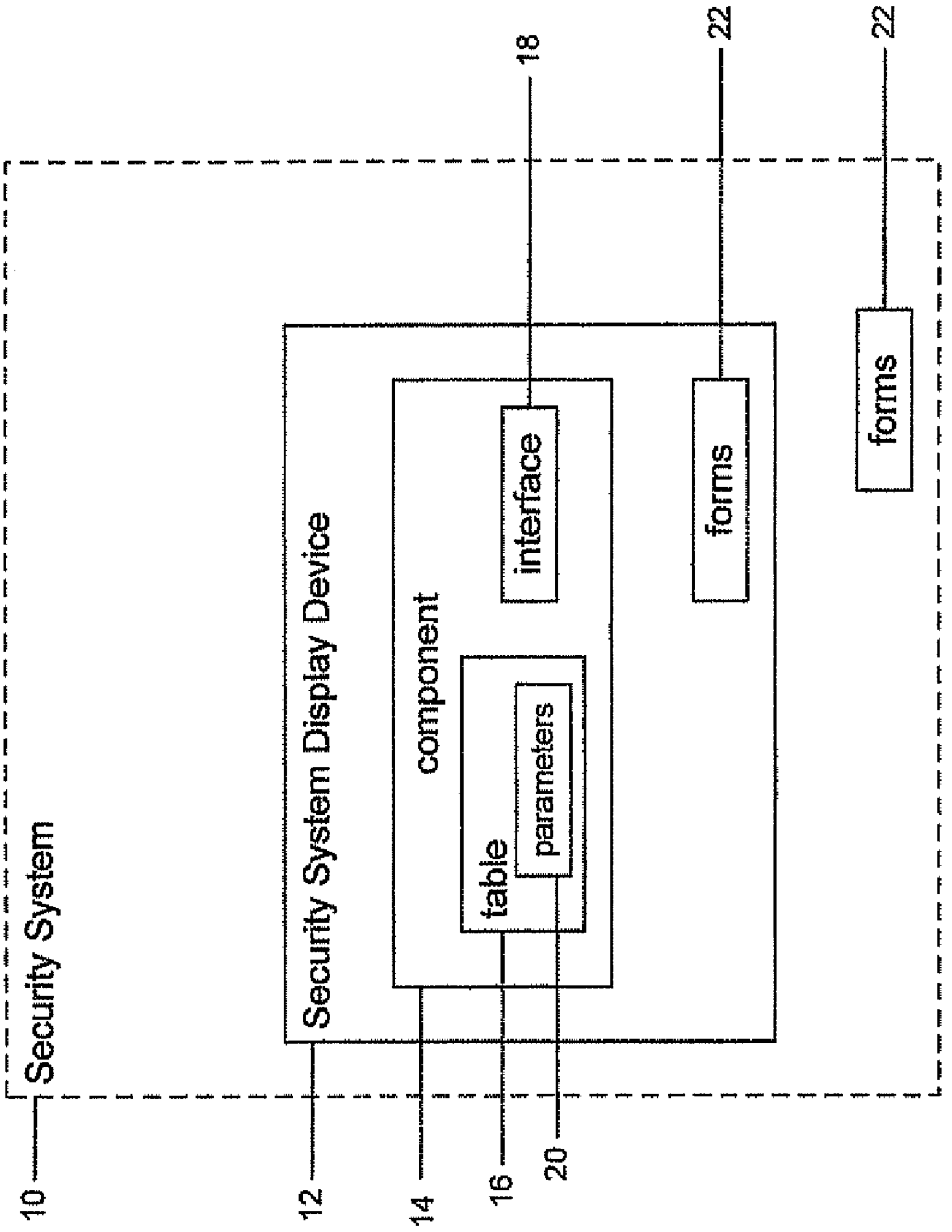
FIG. 1 is a block diagram of an embodiment of the present invention.

FIG. 1 is a block diagram of one embodiment of the invention. In this embodiment, a security system 10 includes a display device or panel 12 in which a priority and/or rules manager or component 14 resides. The component contains two elements, a table 16 and an interface 18. The table 16 contains rules or table parameters 20. Related forms 22, described in detail below, can be located on the display device 12 and/or within the security system 10. The interface 18, which obtains information from the internet (not shown), can communicate with an application. Details of the table 16 and the interface 18 are provided below.

Figure 2:
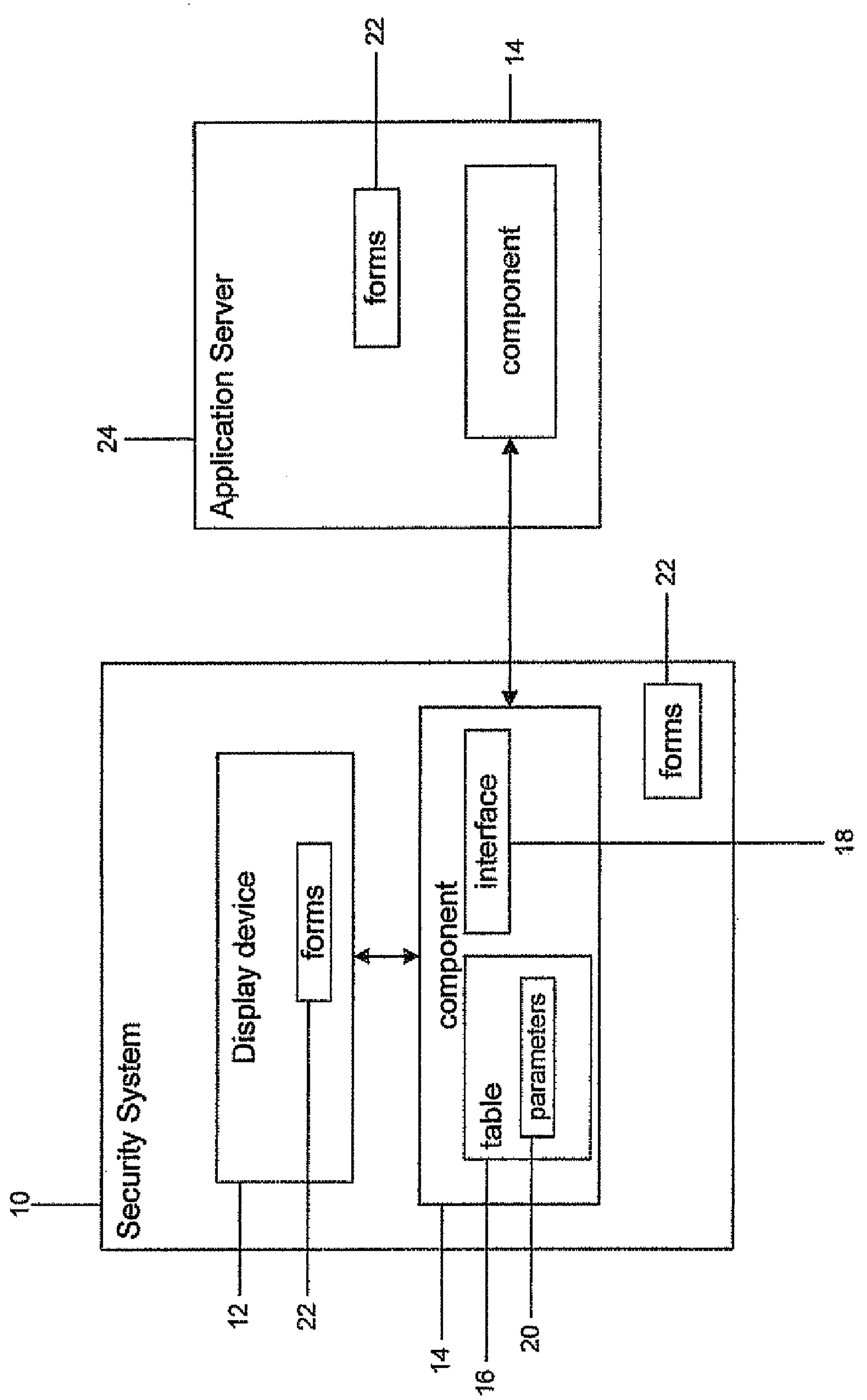
FIG. 2 is a block diagram of another embodiment of the present invention.

In another embodiment, shown in FIG. 2, a portion of the component 14 is within the security system 10 separate from the display panel 12. Another portion of the component 14 is within an application server 24 belonging to a developer or other application source. The table 16, including the table parameters 20, of the component 14 resides in the security system 10. The interface 18 shown in this embodiment exists in both the security system 10 and the application server 24. The forms 22 can be stored on the security system 10, in the display device 12 and/or in the application server 24. In other embodiments (not shown), one or more portions of the component 14 can be found in a graphic keypad of the security system 10, in a graphic display that interacts with the security system, in the control panel logic of the security system 10, or even in a remote server. The portions of the component 14 are not limited to these locations, which are provided for illustrative purposes only. Other locations or combinations of locations, both within the security system 10 and external to it, can be within the scope of the invention. Enabling multiple locations for the portions of the component 14 facilitates total developer freedom for internet sessions. The location of the component 14 is anywhere such that the rules could be applied to the problem.

The interface 18 portion of the component 14 can be an Application Program Interface (API) that establishes a remote server application from an application server 24. The interface 18 provides tools to permit proper rendering to the security system display device 12. More than one display size and/or format for the display device 12 can be offered, and the interface 18 itself can be an API. As discussed above, various interfaces 18 can reside throughout the security system 10 as well as in the remote server application.

The table 16 of the component 14 empowers the security system 10 to have priority to properly and effectively take control of the display of the security system display device 12 for purposes of handling the life and/or safety on premise situations encountered by the security system 10. Situations requiring either notification on the display 12, or accepting input by a user at a touch screen display (not shown) need priority over programs or applications merely displaying their general information over the display device 12.

A set of table parameters 20 that describe the behavior of the system in time of conflict is stored in the table 16 of the component 14. A conflict is defined as how the display device 12 will behave for various situations or alarm conditions of the security system 10. These conditions can be established in cooperation with both the security system developers and the system's users. Examples of alarm conditions include fire alarm, burglar alarm, panic, trouble indicators, loss of air conditioning and/or heat, etc. This is not an exhaustive list, but is meant for illustrative purposes only.

Each conflict is associated with a form 22. The specific parameters 20 in the table 16 indicate what form 22 takes priority based on an event or alarm condition, and where to find that form 22, such as on the internet, on a local site, or stored within the security system 10. Other technical aspects regarding the security system and/or form implementation can also be included in a form 22. Specific parameters 20 in the table 16 can include event type (Event), Form, a location (Location) as to where to get the form, such as an address on a server, a persistence field (Persistence) that tells the system how that form 22 will behave and provides requirements to be satisfied to complete the form 22. Additional parameters 20 can be Event Priority, indicating, for example, that there is no higher priority event that could override this form 22 until satisfied, and Next Action that provides instructions regarding the next form 22 to implement. These instructions can be either directions to return to the previous form 22 that was on display immediately before the current form 22 became active, or a name of a specific form 22 that is to be displayed after satisfying all of the requirements in the Persistence parameter of the present form 22.

An example is provided for illustrative purposes. A fire alarm occurs in a residence having the inventive security system 10. Prior to the fire alarm, the display device 12 had been displaying a message from an application, e.g. a cable provider, indicating the top five movies available for special price on-demand viewing that night. The specific parameters 20 that control the behavior of the display device 12 are as follows. Event is "Fire Alarm"; Form is "fire.frm", Location is "AlarmNet.com/customer-A" and Persistence is "Until code entry". The Event Priority is "Event can disrupt", and Next Action is "Return to form". In this example, the form 22 will stay persistent until a proper code entry is made at the display.

Figure 3:
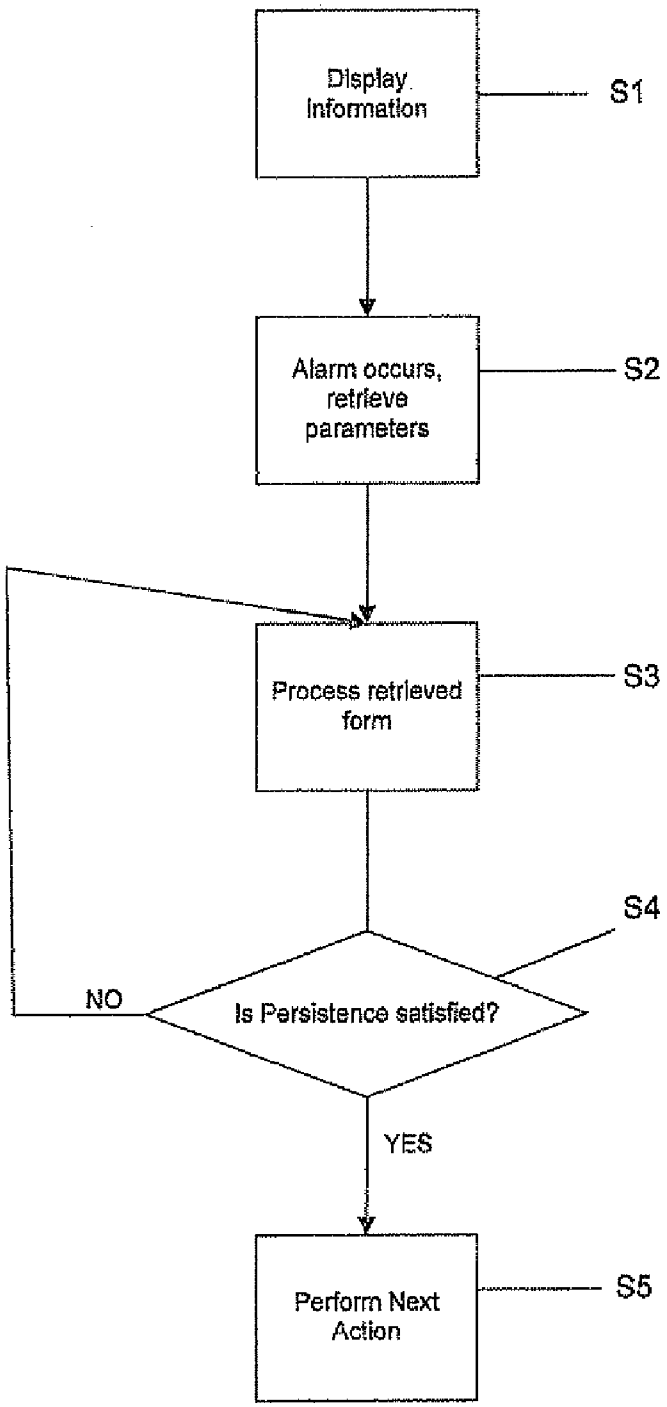
FIG. 3 is a flow chart of an embodiment of the present invention.

FIG. 3 shows a flow chart of the operation of the inventive system. In step S1, data or information is displayed on the display device 12. When an alarm occurs, the component 14 retrieves the parameters 20 associated with this alarm or event in step S2. Next, in step S3, the form 22 in the retrieved parameters 20 is activated and its contents are processed. The processing continues until the persistence requirement is satisfied. If the persistence requirement is satisfied, step S4=YES, then the form 22 described or named in Next Action is activated in step S5. Otherwise, step S4=NO, processing continues at step S3.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A device for enabling external applications to display data in a security system having alerts, said device comprising:

a database component stored on a non-transitory computer readable medium, the database component storing a table having a plurality of rules that indicate what events take priority when the device is in conflict; and an interface for processing the external application data for display, wherein when an alert occurs in the security system, one of the plurality of rules defines a response to the alert, wherein each rule includes a form stored in at least one of at least two locations, wherein each rule includes a location, the location identifying the at least one of the at least two locations where the form is stored, and wherein the device performs the response.

2. The device according to claim 1, wherein the interface resides on a server and the device resides in the security system and in the server.

3. The device according to claim 1, wherein each rule comprises an event, a form, a location, a persistence, a priority, and a next action.

4. The device according to claim 1, wherein the alert is one of a system interrupt and a user interrupt.

5. A method for enabling external applications to display data in a security system having alerts, said method comprising the steps of:

displaying data from the external application;

receiving an alert;

determining a response to the alert using one of a plurality of rules that indicate what events take priority when the device is in conflict; and performing the response, wherein each rule includes a form stored in at least one of at least two locations, and wherein each rule includes a location, the location identifying the at least one of the at least two locations where the form is stored.

6. The method according to claim 5, wherein the step of performing further comprises satisfying a requirement in the one rule.

7. The method according to claim 5, wherein the response comprises processing an event, a persistence, a priority, and a next action.

8. The method according to claim 5, wherein the alert is one of a system interrupt and a user interrupt.

9. A non-transitory computer readable medium having computer readable program for operating on a computer for enabling external applications to display data in security system having alerts, said program comprising instructions that cause the computer to perform the steps of:

displaying data from the external application;

receiving an alert;

determining a response to the alert using one of a plurality of rules that indicate what events take priority when the device is in conflict; and performing the response, wherein each rule includes a form stored in at least one of at least two locations, and wherein each rule includes a location, the location identifying the at least one of the at least two locations where the form is stored.

10. The computer readable program according to claim 9, wherein the step of performing further comprises satisfying a requirement in the one rule.

11. The computer readable program according to claim 9, wherein the response comprises processing an event, a persistence, a priority, and a next action.

12. The computer readable program according to claim 9, wherein the alert is one of a system interrupt and a user interrupt.

* * * * *